July 29, 1969  K. HERRLE ET AL  3,458,467
CONTINUOUS EMULSION POLYMERIZATION
Filed Dec. 27, 1965  2 Sheets-Sheet 1

INVENTORS:
KARL HERRLE
KARL HEINZ BAUMANN
WILHELM BECKMANN
EDUARD HEIL
BY
*Marzall, Johnston, Cook & Root*
ATT'YS July 29, 1969  K. HERRLE ET AL  3,458,467
CONTINUOUS EMULSION POLYMERIZATION
Filed Dec. 27, 1965  2 Sheets-Sheet 2
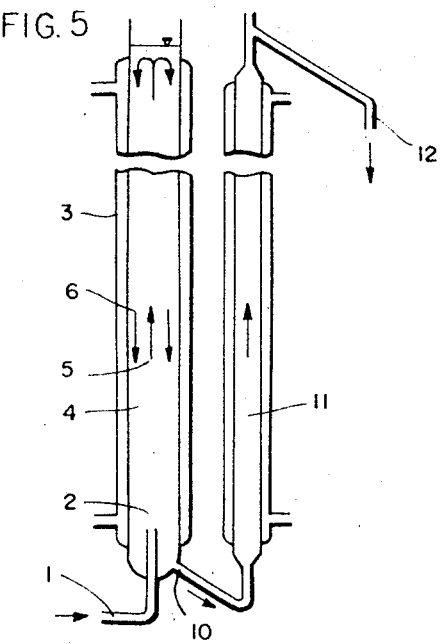
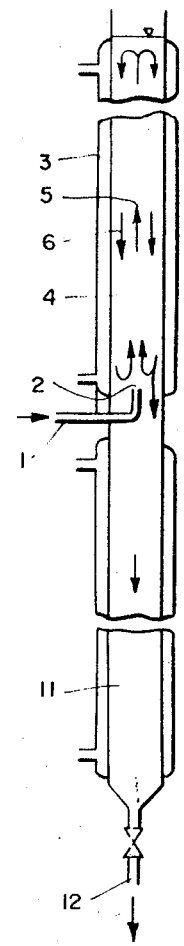
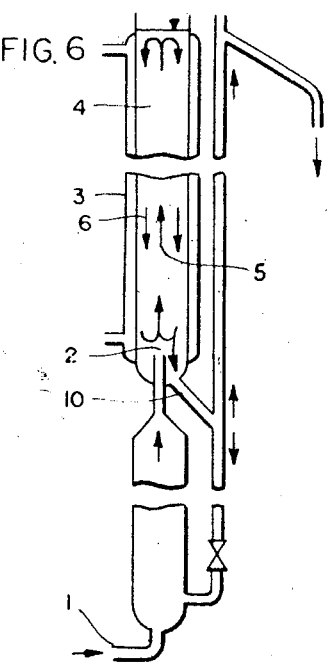
INVENTORS:
KARL HERRLE
KARL HEINZ BAUMANN
WILHELM BECKMANN
EDUARD HEIL
BY
Marzall, Johnston, Cook & Root
ATT'YS United States Patent Office 3,458,467
Patented July 29, 1969

3,458,467
CONTINUOUS EMULSION POLYMERIZATION
Karl Herrle and Karl Heinz Baumann, Ludwigshafen (Rhine), and Wilhelm Beckmann and Eduard Heil, Limburgerhof/Pfalz, Germany, assignors to Badische Anilin- & Soda-Fabrik Aktiengesellschaft, Ludwigshafen (Rhine), Germany
Filed Dec. 27, 1965, Ser. No. 516,274
Claims priority, application Germany, Jan. 2, 1965, B 79,970; Feb. 6, 1965, B 80,403
Int. Cl. C08f 1/06, 1/13
U.S. Cl. 260—29.6                                    9 Claims

ABSTRACT OF THE DISCLOSURE

Process for the emulsion polymerization of olefinically unsaturated monomers which are substantially insoluble in water by continuously recirculating the polymer dispersion as an aqueous reaction medium in a vertically arranged tubular circulation system without mechanical stirring, supplying a monomer emulsion in an axial and upward flow into the circulation system for blending therein with an excess of polymer dispersion already formed, and partly withdrawing the polymer dispersion from the circulation system at a point not higher than the inlet for the monomer emulsion and at the same rate at which the monomer emulsion is supplied to the recirculating polymer dispersion.

---

Figure 1:
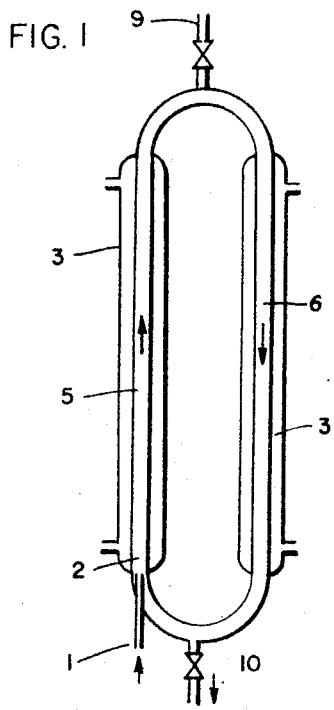

This invention relates to a process for the continuous emulsion polymerization of olefinically unsaturated compounds without using stirrers.

Various processes are known for continuous emulsion polymerization. They are in general carried out in a stirred vessel or stirred autoclave while the reaction material is mixed, the polymer dispersion being withdrawn from the reaction vessel at the same rate at which the monomer emulsion is supplied to it. It is also possible to arrange several reactor in series to form a so-called cascade in which the monomer emulsion or the monomer and the emulsifier is supplied at one end and the polymer dispersion is withdrawn at the other end. These processes, however, involve considerable expenditure for equipment and necessitate the use of large amounts of emulsifiers. Moreover, relatively large amounts of coagulate are formed in these processes so that the polymerization equipment has to be cleaned quite frequently.

It is also known that continuous emulsion polymerization may be carried out in a simple stationary or vibrating flow tube, but this process has not established itself in practice, probably because irregularities in the reaction rate easily occur.

Furthermore it is known that emulsion polymerization may be carried out continuously in a loop-shaped reactor without the use of stirrers, the monomer (a portion of which may be emulsified) being supplied to the lower end of the ascending part of the loop and the monomer which separates in the upper part of the loop being collected and recyled to the lower end of the loop. This process has the disadvantage however that fairly large amounts of coagulate are formed. Another point is that unreacted monomer frequently does not separate cleanly in the upper part of the loop so that separation and recycling is difficult.

It is an object of the present invention to improve the prior art processes and to produce polymer dispersions which are practically free from coagulate in high conversions by emulsion polymerization of conventional olefinically unsaturated monomers. It is another object of the invention to achieve this even when using small amounts of emulsifier. Further objects and advantages of the invention will be apparent from the following.

We have found that continuous emulsion polymerization of conventional olefinically unsaturated monomers which are practically insoluble or, at the most, partly soluble in water, in aqueous medium in the presence of conventional polymerization catalysts may be carried out with particular advantage by continuously supplying the monomers exclusively in emulsified form through a tube in an axially upward flow at a flow viscosity of 5 to 100 cm. per sec. to the lower part of a vertically arranged circulation system, e.g., a reaction loop, blending them with an excess of polymer dispersion which has already formed, polymerizing them in the circulation system without the use of mechanical stirrers up to a mean conversion of more than 75% and withdrawing, at a point not higher than the point of entry 2 of the monomer emulsion into the circulation system, polymer dispersion at the same rate at which the monomer emulsion, if desired together with polymer dispersion, is supplied to the circulation system.

Figure 2:
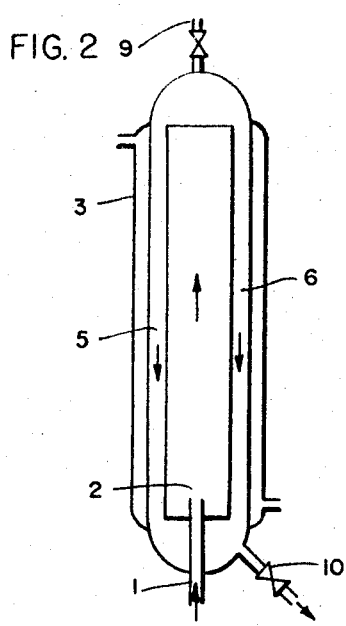
Figure 3:
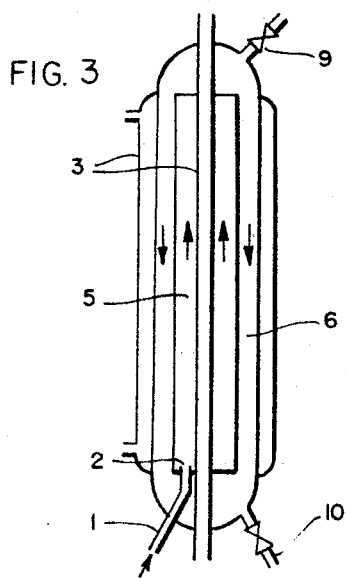
Figure 4:
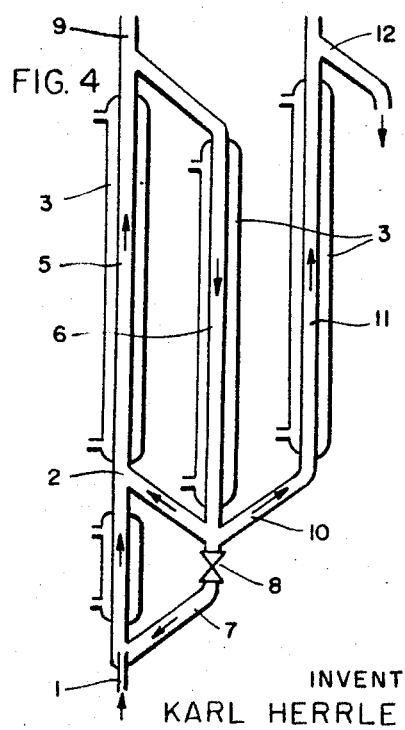

The vertically arranged circulation systems in which the polymerization is carried out in aqueous medium are usually closed tubular loops having an open shape, as shown in FIGURES 1 and 4; but circulation systems consisting of concentric tubes, as shown in FIGURES 2 and 3 are also eminently suitable for the process. The circulation systems shown in the figures may, of course, be modified in many respects, always on condition however that there is upward and downward flow of the aqueous polymer meduim in the system and that the ascending and/or descending parts of the system can be heated or cooled. Heating or cooling is usually effected by means of heating or cooling jackets 3 or a heatable and coolable tube system in the circulation system (FIG. 3).

The process according to this invention may be carried out with particular advantage by supplying the monomer emulsion through an upwardly directed tube 1 arranged concentrically to the tower, to a tower-shaped reactor (cf. FIGURES 5 to 7) which apart from the supply tube contains no inserts and whose height above the supply tube opening 2 is four to thirty times, particularly four to twenty times, the internal diameter (D) of the reactor in this zone, effecting emulsion polymerization in the reactor 4 and withdrawing the polymer dispersion from the reactor at the same height as, or below, the point of entry 2 of the monomer emulsion. The tower-shaped reactor 4 has the advantage that it is a simple apparatus which can be easily cleaned. It is surprising that a tubular insert for separating the ascending and descending phases can be dispensed with and that nevertheless such a high conversion can be achieved.

Introduction of the monomer emulsion, whose particles advantageously have a mean diameter of less than 5 microns, into the circulation system is effected in the lower part of the ascending section 5 of the circulation system through a tube in an axially upward flow having a velocity of 5 to 100 cm. per sec. at the point of entry 2. The flow velocity of the monomer emulsion at the point of entry 2 is generally two to ten times greater than the mean flow velocity of the dispersion present in the circulation system. Preferred flow velocities of the monomer emulsion at the point of entry 2, especially in the case of reaction towers, are 5 to 20 cm. per sec. The flow velocity may be regulated by varying the internal width of the opening of the tube at the point of entry, i.e., by means of suitable nozzles. The amount of monomer emulsion to be supplied depends on the rate of polymerization of the system concerned under the reaction conditions in the circulation system and is so adjusted that a mean conversion of more than 75% is reached in the polymerization circulation system. The size of the tube opening at the point of entry 2 is therefore determined by the amount of monomer emulsion to be supplied and the velocity at which it is to enter the reactor.

Immediately upon entering the reaction loop the monomer emulsion is blended with an excess of polymer dispersion which has already formed and which is preferably taken from the descending part 6 of the loop, advantageously with such amounts of polymer dispersion that the weight ratio between monomer and polymer is less than 0.5. It is also possible to blend the monomer emulsion, before it enters the circulation system, with such an amount of polymer dispersion that the weight ratio between monomer and polymer is less than 1, at a temperature below the polymerization temperature. This is advantageously done in a mixing loop (cf. 7 in FIG. 4) arranged ahead of the circulation system and maintained at a lower temperature. The two methods of blending the monomer emulsion with the polymer dispersion may be combined. One embodiment of such a combination is shown in FIG. 4. The supply of specific amounts of polymer dispersion to the points where they are required may be regulated by valves 8 and controlled by mixing the initial temperatures of the components and the temperature of the mixture. It is advantageous to introduce the emulsion into the polymerization circulation system at a temperature which is 5° to 20° C. below the polymerization temperature. Usually, when the apparatus is started up, a polymer dispersion is initially used in the polymerization circulation system. It is, however, also possible to use water or soap solution for this purpose.

The monomer emulsion blended with polymer dispersion rises to the top 5 of the circulation system owing to its low specific gravity and descends again in the other part 6 of the reactor, particularly near the cooled reactor walls. Thus, circulation of the reaction material in the system is set up by virtue of the difference between the specific gravity of the monomer emulsion and that of the polymer dispersion.

The mean flow velocity of the dispersion in the circulation system depends on the viscosity of the dispersion, which in turn depends on the type of monomers, emulsifiers and polymer and on the concentration of the dispersion. When soaps are used as emulsifiers, dispersions having a content of 60% or more may be produced without difficulty by the process according to this invention. The mean flow velocity also depends on the difference between the specific gravity of the monomers and that of the polymers, the concentration and the difference in temperature between the ascending and descending parts of the circulation system. A difference in temperature between the ascending part 5 and the descending part 6 of the polymerization circulation system of about 2° to 20° C., particularly 5° to 10° C., depending on the size of the apparatus and the rate of polymerization, is often advantageous. It is controlled by the heating and/or cooling means 3. The mean flow velocity which develops of its own accord, is about 0.2 to 5 cm. per sec. and generally suffices. It is easily estimated and calculated in an experiment using a model. In special cases, particularly when the apparatus is started up, it can be increased for example by blowing an inert gas, such as nitrogen, into the ascending part of the circulation system, the gas escaping at the top of the system through a gas valve 9. The flow velocity in the circulation system may also be increased by bringing the monomeric material to its boiling point at the temperature prevailing in the ascending part 5 of the loop by adjusting the pressure. Boiling brings about additional internal cooling during polymerization. The monomer vapor formed escapes through a gas valve 9 at the top of the circulation system and may be reused after condensation and emulsification. Additional acceleration of the circulation by mechanical means, e.g., conventional propellers or stirrers, is usually not advantageous.

If a mixing loop is used, the residence time of the monomer emulsion in the mixing loop is generally about 3 to 10 minutes and is the shorter, the smaller the size of the particles in the monomer emulsion and the better the solubility of the monomer in water and in the polymer. The mean residence period in the polymerization circulation system is 0.5 to 20 hours, preferably 1 to 10 hours, and depends on the rate of polymerization of the monomers under the given conditions.

Withdrawal of the polymer dispersion from the circulation system is effected in the lower part of the system at the same height as or preferably below the point 2 at which the emulsified monomers enter the circulation system, because in this zone the conversion is highest (10). The polymer dispersion is discharged continuously at the same rate at which the monomer emulsion, if desired together with polymer dispersion, is introduced through the tube into the polymerization circulation system. The monomers are polymerized in the circulation system to a conversion of more than 75%, particularly 80 to 98%. By arranging another polymerization zone 11, as shown in FIGURES 4, 5 and 7, after the circulation system, the conversion can be increased even further. In these cases the polymer dispersion leaves the apparatus at 12.

The process according to this invention is suitable for continuous emulsion polymerization of the usual olefinically unsaturated compounds which are practically insoluble or, at the most, partly soluble in water. Examples of preferred monomers are esters of acrylic and/or methacrylic acid with alcohols having one to eight carbon atoms, such as ethyl acrylate and butyl acrylate; vinyl esters of carboxylic acids having one to eight carbon atoms, such as vinyl acetate, vinyl propionate and vinyl pivalate, or vinyl esters of higher carboxylic acids prepared by reaction of carbon monoxide, water and olefins; styrene, vinyl chloride and vinylidene chloride. Copolymerization of olefinically unsaturated compounds, e.g., of the above monomers with each other or with 0.1 to 10% by weight, with reference to the amount of monomers, of polar hydrophilic monomers, such as acrylic acid, methacrylic acid, acrylamide or N-methylol methacrylamide, is also possible.

The monomer emulsion is prepared in a conventional manner by means of the usual assistants for emulsion polymerization. The amount of emulsifier may be kept relatively low in the process according to this invention, e.g., at 0.1 to 1%. Ionic as well as nonionic emulsifiers, e.g., nonionic polyethylene oxide derivatives, may be used for the process according to this invention.

Water-soluble catalysts which are commonly used in emulsion polymerization, such as potassium persulfate, hydrogen peroxide or ammonium persulfate, as well as water-insoluble catalysts, such as azodiisobutyronitrile, or organic per-compounds, such as benzoyl peroxide or dialkyl percarbonates, may be used as catalysts.

The process according to this invention has various advantages over prior art processes for continuous emulsion polymerization. Practically no coagulate is formed, even when very small amounts of emulsifier are used. The monomers may be polymerized rapidly to high conversions, and highly concentrated polymer dispersions may be prepared without difficulty. Since in the process according to this invention the emulsion is subjected to hardly any mechanical stress, it is possible to use very small amounts of emulsifier, a fact which is of advantage in the further use of the polymer dispersion. It is also possible to produce particularly coarse dispersions by the process according to this invention.

The invention is further illustrated by the following Examples in which parts and percentages are by weight, unless otherwise stated. Parts by volume bear the same relation to parts by weight as the liter to the kilogram.

Example 1

100 parts of butyl acrylate, 1 part of acrylic acid, 0.5 part of potassium persulfate and 100 parts of water are made into an emulsion by means of an intensive stirrer, using 1 part of dodecylbenzene sulfonate as emulsifier.

A polymerization apparatus as shown in FIGURE 1 and having a capacity of 800 parts by volume is charged with a 50% dispersion of polybutyl acrylate for starting up. The heating jacket 3 of the left-hand ascending vertical part 5 of the loop is heated to 85° C., that of the right-hand descending vertical part 6 to 75° C. When the dispersion has reached a mean temperature of about 76° C., 1600 parts by volume per hour of monomer emulsion having the abovementioned composition is pumped in through a tube at a flow velocity of about 20 cm. per sec.; at the point of entry 2 into the reaction loop, the monomer emulsion is blended with polymer dispersion in the ratio of 1:20. The same amount of polymer dispersion as that of monomer emulsion supplied flows off through a riser and an overflow which is located at the same height as the degassing means. The dry content of the polymer dispersion is about 47%; this is equivalent to a conversion of about 92%. The polymerization may be completed by subsequent heating at 90° C. for a short period. The dispersion is suitable for preparing the adhesive layer of adhesive tapes.

Example 2

A polymerization apparatus as shown in FIGURE 4 but without the post-polymerization zone 11, whose polymerization loop has a capacity of 1500 parts by volume, is filled, for the purpose of starting up, with a 40% dispersion of polymethyl methacrylate produced by a batchwise method and is heated. The jacket temperature in the lower part of the mixing loop 7 is 60° C., in the ascending vertical part 5 of the polymerization loop 85° C. and in the descending vertical part 6 of the polymerization loop 75° C. When the charge in the polymerization loop has reached a temperature of about 75° C., 1500 parts by volume per hour of a monomer emulsion is pumped through tube 1 into the loop at 2 at a flow velocity of about 30 cm. per sec., the said monomer emulsion having been prepared by mixing 150 parts of distilled water, 1 part of dodecylbenzene sulfonate, 100 parts of methyl methacrylate and 0.5 part of azodiisobutyronitrile. The relative proportions of monomer emulsion, polymer dispersion in the mixing loop and plymer dispersion in the polymerization loop, determined by temperature measurement, are 1:4:25.

The dry content of the polymer dispersion leaving the apparatus reaches 37% after a while, which is equivalent to a conversion of about 92%. The light transmission of a layer 2 cm. in thickness of the dispersion diluted to 0.01% as compared with that of water—a measure of the particle size—is at first 92%, decreases to 24% in the course of twelve hours and then remains constant.

Example 3

The procedure of Example 2 is followed but 0.2 part of potassium persulfate is used instead of 0.5 part of azodiisobutyronitrile. A polymer dispersion is obtained having a dry content of 38%, which is equivalent to a conversion of about 95%. The light transmission of a layer 2 cm. in thickness of the dispersion diluted to 0.01% is 33%.

Example 4

A monomer emulsion prepared from 99 parts of water, 1 part of an alkyl sulfonate having 10 to 16 carbon atoms in the alkyl radical, 0.2 part of sodium pyrophosphate, 0.6 part of potassium persulfate, 50 parts of butyl acrylate, 48 parts of vinyl acetate and 2 parts of acrylic acid is introduced, as described in Example 2, at a flow velocity of about 20 cm. per sec. into the reaction loop shown in FIGURE 4 having a polymerization loop with a capacity of 1500 parts by volume and a post-polymerization zone 11 with a capacity of 700 parts by volume, and polymerized.

The throughput is 1500 parts by volume per hour, the mean temperature in the ascending part of the polymerization loop is 78° C., in the descending part of the polymerization loop 77° C. and in the post-polymerization zone 86° C.

The following relative proportions were ascertained by temperature measurement: monomer emulsion: polymer dispersion in the mixing loop: polymer dispersion in the polymerization loop=1:3:20.

The polymer dispersion leaving the polymerization loop has a dry content of 45%. When it passes through the post-polymerization zone, its dry content increases to 48%, which is equivalent to a conversion of about 96%.

Example 5

The procedure described in Example 4 is followed, but in addition 300 parts by volume per hour of nitrogen is blown in through a branch in the supply tube for the monomer emulsion. The nitrogen rises through the dispersion in large bubbles and escapes at the top of the apparatus. After appropriate adjustment of the control valve 9 the following relative proportions are ascertained: monomer emulsion: polymer dispersion in the mixing loop: polymer dispersion in the polymerization loop=1:3:32. In order to ensure the same internal temperature as in Example 4, it is necessary to raise the jacket temperature in the ascending part of the polymerization loop by 2° C. The polymer dispersion leaving the apparatus has the same specific gravity as in Example 4. The conversion is 96%.

Example 6

A monomer emulsion is prepared by mixing 100 parts of vinyl propionate, 150 parts of water, 0.2 part of sodium vinyl sulfonate, 0.1 part of the adduct of 25 moles of ethylene oxide to 1 mole of octadecyl alcohol, 0.3 part of sodium pyrophosphate and 0.3 part of potassium persulfate in a stirred vessel. A polymerization apparatus according to FIGURE 1 having a capacity of 100 parts by volume is filled with distilled water and heated to a mean internal temperature of 80° C. In order to achieve circulation of the contents in the desired direction, the external temperature of the ascending part 5 of the polymerization loop is kept at 85° C. and that of the descending part 6 at about 75° C.

10 parts of the monomer emulsion is then pumped into the apparatus. As soon as polymerization sets in (after about 10 minutes), which may be recognized by an increase in temperature and the appearance of a bluish opalescence in the reaction material, 100 parts by volume per hour of monomer emulsion is pumped in continuously at a flow velocity of 40 cm. per sec. The internal temperature rises slowly and is kept constant at 85° C. by lowering the temperature in the jackets, first of all in the jacket of the ascending part.

The same amount of polymer dispersion as that of monomer emulsion supplied flows off continuously through an overflow. The polymerization equilibrium is reached after about four hours. The polymer dispersion which leaves the apparatus has a dry content of 57%, which is equivalent to a conversion of 97%.

Example 7

A mixture of 40 parts of distilled water, 60 parts of vinyl propionate, 0.12 part of sodium vinyl sulfonate, 0.06 part of the reaction product of 25 moles of ethylene oxide and 1 mole of octadecyl alcohol, 0.18 part of sodium pyrophosphate and 0.18 part of potassium persulfate is made into an emulsion by intensive stirring.

A tower-shaped reactor 4 according to FIGURE 5, which has a capacity of 10 parts by volume and a ratio of diameter to height of 1:30 and into which a tube for the supply of monomer emulsion has been introduced concentrically from below, whose length in the reactor is five times the diameter of the tower, is filled with distilled water and heated to an internal temperature of 80° C. 1 part of the monomer emulsion described above is then pumped in by means of a metering pump. After about 10 minutes polymerization sets in, which can be recognized by the fact that the reaction material becomes bluish in color and the internal temperature of the reactor rises. Another 3 parts of the monomer emulsion is then pumped in in the course of one hour. The amount to be supplied is then increased to 5 parts per hour and after another hour to 6.7 parts per hour (flow velocity about 20 cm. per sec.). The internal temperature of the reactor is kept constant at 85° C. by lowering the jacket temperature. The same amount of polymer dispersion as that of monomer emulsion supplied is withdrawn at the lower end of the reaction tower. The polymer dispersion obtained has a dry content of 57%, which is equivalent to a conversion of 95%. By post-polymerization for one hour the conversion can be increased to 99%.

Example 8

A reaction tower according to FIGURE 5 is used which has a capacity of 10 parts by volume and a height five times its diameter and is provided with a tube 1 for the supply of monomer emulsion, whose length in the reactor is equal to the diameter of the reactor. The reaction tower is charged with a polymer dispersion which has been prepared by batchwise polymerization of a mixture of 82 parts of styrene, 3 parts of acrylic acid, 15 parts of acrylonitrile, 4 parts of 50% Turkey red oil, 0.5 part of potassium persulfate and 250 parts of distilled water. The contents of the reactor are heated to 80° C. and kept at this temperature by regulating the jacket temperature of the reactor. 10 parts per hour of a monomer emulsion obtained by intensive stirring of a mixture having the above composition is pumped in; at the same time a weak stream of nitrogen is allowed to bubble through the rising dispersion on entering the reactor through a line incorporated concentrically in the tube for the supply of the monomer emulsion. An amount of polymer dispersion equal to that of emulsion supplied is withdrawn at the bottom of the reaction tower and passed through a zone heated to 90° C. and having a capacity of 5 parts by volume, which it leaves through an overflow. The polymer dispersion obtained has a dry content of about 40%, which is equivalent to a conversion of about 99%.

Example 9

A reaction tower as shown in FIGURE 5 (capacity: 10 parts by volume; ratio of diameter to height=1:15; length of the tube for introducing the monomer emulsion three times the diameter of the reactor) is charged with a polymer dispersion obtained by batchwise polymerization of a mixture of 80 parts of vinylidene chloride, 18 parts of acrylonitrile, 2 parts of methacrylamide, 0.3 part of the sodium salt of sulfochlorinated paraffins having 10 to 15 carbon atoms, 0.3 part of potassium persulfate and 100 parts of water. The contents of the reactor are heated to 62° C. Then 3 parts per hour of a monomer emulsion obtained by intensive stirring of the mixture described above is added (flow velocity about 20 cm. per sec.). The jacket temperature of the reactor is so regulated that the contents of the reactor boil slightly at 60° to 62° C. The escaping vapor is condensed in a rising cooler above the reactor and the condensate is passed to a stirred vessel arranged ahead of the reactor. The polymer dispersion is withdrawn as described in Example 8 and has a dry content of about 50%.

Example 10

A mixture of 50 parts of water, 30 parts of butyl acrylate, 20 parts of vinyl acetate, 0.1 part of sodium vinyl sulfonate, 0.6 part of the sodium salt of sulfochlorinated paraffins having 10 to 15 carbon atoms, 0.15 part of acrylic acid and 0.18 part of potassium persulfate is made into an emulsion by stirring. The inert gases contained in the emulsion are then removed while stirring by bringing the emulsion to the boil by applying a vacuum. The monomers evaporating at the same time and the water vapor are condensed in a reflux cooler and returned to the emulsion. The degassed monomer emulsion is introduced into tower-shaped reactor described in Example 7 and shown in FIGURE 5 which is filled with a polymer dispersion produced by a batchwise process and having the same composition, its temperature being 78° C. The throughput is 8 parts by volume per hour. Part of the heat of polymerization is dissipated by withdrawing polymer dispersion after the main polymerization zone at the same rate at which monomer emulsion is supplied to the reactor, cooling it to about room temperature and passing it to the upper part of the reactor while preventing it from coming into contact with air.

We claim:

1. In a process for the emulsion polymerization of at least one olefinically unsaturated monomer, which is partly to completely insoluble in water, in an aqueous medium in the presence of an emulsifying agent and a polymerization catalyst, the improvement for carrying out said emulsion polymerization continuously which comprises:

circulating an aqueous polymer dispersion formed by said emulsion polymerization in a substantially vertically arranged elongated tubular reaction zone in which said dispersion first flows upwardly and is then returned downwardly in a recirculating flow pattern to provide a continuous circulation system;

supplying said at least one monomer exclusively in the form of an aqueous emulsion through an inlet tube arranged within the lower part of said tubular reaction zone at an axially and upwardly directed flow velocity of about 5 to 100 cm./sec. for blending of the monomer with an excess of the recirculating polymer dispersion at the point of entry of the monomer;

polymerizing said at least one monomer during its cocurrent flow with said polymer dispersion without the use of mechanical stirrers to a mean conversion of more than 75%; and withdrawing the polymer dispersion from said reaction zone at a point of the downwardly flowing dispersion not higher than the point of entry of said monomer emulsion and at the same rate at which the monomer emulsion is supplied to the reaction zone.

2. A process as claimed in claim 1 wherein the monomer emulsion, when entering the circulation system, is blended with polymer dispersion which has already formed to form a mixture in which the weight ratio of monomers to polymer is less than 0.5.

3. A process as claimed in claim 1 wherein the monomer emulsion to be supplied is blended, before being introduced into the circulation system, with such an amount of polymer dispersion that the weight ratio of monomers to polymer is less than 1.

4. A process as claimed in claim 1 wherein the flow velocity at which the monomer emulsion is introduced is about 5 to 50 cm. per sec. and two to ten times greater than the mean flow velocity of the dispersion present in the circulation system.

5. A process as claimed in claim 1 wherein the ascending part of said continuous circulation system is maintained at a temperature which is about 2° to 20° C. higher than the temperature in the descending part of said system.

6. A process as claimed in claim 1 wherein the monomer emulsion supplied has a particle size of less than 5 microns.

7. A process as claimed in claim 1 wherein an inert gas is allowed to pass through the ascending part of the circulation system in small bubbles.

8. A process as claimed in claim 1 wherein the dispersion in the ascending part of the circulation system is brought to the boil by means of subatmospheric pressure and the temperature.

9. A process as claimed in claim 1 wherein the monomer emulsion is introduced through a concentrically arranged upwardly directed tube into a tower-shaped reactor which apart from the supply tube contains no inserts and whose height above the supply tube opening is four to thirty times the internal diameter of the reactor in this zone, emulsion polymerization is effected in the tower-shaped reactor and the polymer dispersion is withdrawn from the reactor at the same height as, or below, the point of entry of the monomer emulsion.

References Cited

UNITED STATES PATENTS

| | | | |
|---|---|---|---|
| 2,317,878 | 4/1943 | Bannon | 260—95 |
| 2,885,389 | 5/1958 | Schappert | 260—94.9 |
| 2,989,517 | 6/1961 | Hanson et al. | 260—95 XR |

JOSEPH L. SCHOFER, Primary Examiner

WILLIAM F. HAMROCK, Assistant Examiner

U.S. Cl. X.R.

23—285, 288.3; 260—79.3, 80.73, 80.8, 86.1, 86.7, 87.5, 89.5, 92.5, 93.5, 93.7, 95